United States Patent [19]
Sawada

[11] 4,222,723
[45] Sep. 16, 1980

[54] MOLDS FOR INJECTION MOLDING OF CONTINUOUS SLIDE FASTENER CHAIN

[75] Inventor: Mitsuo Sawada, Kurobe, Japan

[73] Assignee: Yoshida Kogyo K.K., Japan

[21] Appl. No.: 54,422

[22] Filed: Jul. 3, 1979

[30] Foreign Application Priority Data

Jul. 4, 1978 [JP] Japan .................................. 53-92717

[51] Int. Cl.² ........................... B29D 5/00; B29F 1/06
[52] U.S. Cl. .................................... 425/116; 425/545;
425/814; 425/129 R
[58] Field of Search ............... 425/116, 121, 122, 127,
425/129 R, 814, 545, DIG. 34

[56] References Cited

U.S. PATENT DOCUMENTS

| | | | |
|---|---|---|---|
| 2,471,258 | 5/1949 | Bolten | 425/814 X |
| 3,178,772 | 4/1965 | Molin | 425/122 X |
| 3,234,756 | 2/1966 | Hanson | 425/116 X |
| 3,849,042 | 11/1974 | Anderegg | 425/122 X |
| 3,892,507 | 7/1975 | Garcia | 425/814 X |
| 4,074,413 | 2/1978 | Taccani | 425/814 X |

*Primary Examiner*—J. Howard Flint, Jr.
*Attorney, Agent, or Firm*—Hill, Van Santen, Steadman, Chiara & Simpson

[57] ABSTRACT

Disclosed are molds, one being stationary the other movable, for the injection molding of continuous slide fastener chain, each of the molds being provided with a upper runner stopper located at the end portion of a runner cavity on the tape entrance side of the molds, the upper runner stopper having a trapezoidal portion which projects toward the interior of the runner cavity, and with a lower runner stopper disposed on the tape exit side of the molds, the stationary mold having a positioning stopper adjacent said lower runner stopper, the positioning stopper having a trapezoidal portion of a shape to engage with a recess formed in the posterior end of a runner by means of the trapezoidal portion of the upper runner stopper.

2 Claims, 4 Drawing Figures

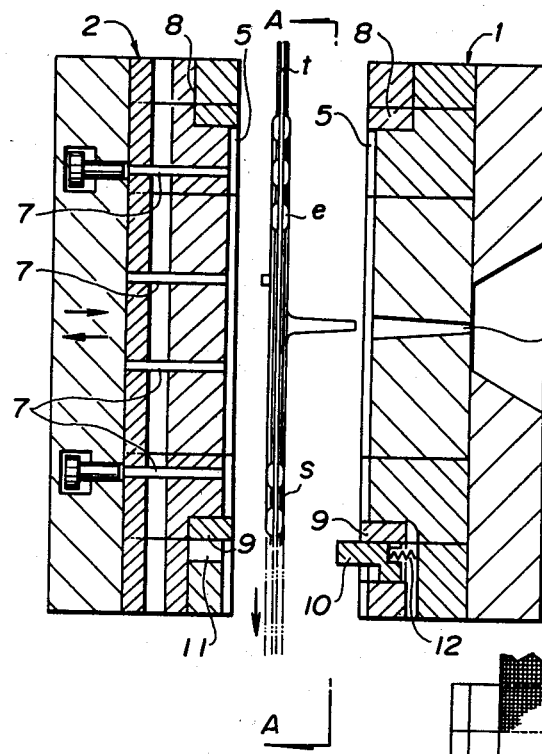
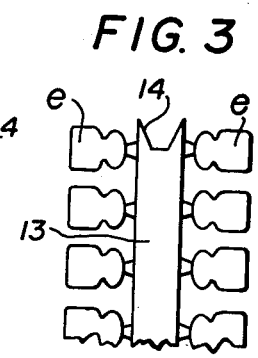
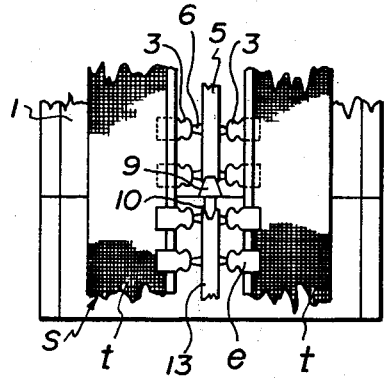
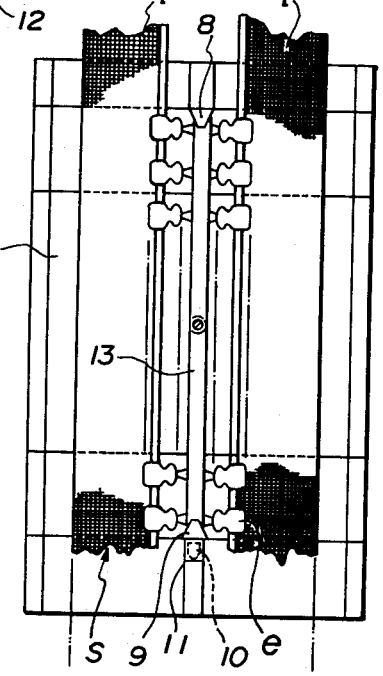

MOLDS FOR INJECTION MOLDING OF CONTINUOUS SLIDE FASTENER CHAIN

BACKGROUND OF THE INVENTION

1. Field of the Invention

This invention relates to molds employed in an injection molding apparatus for providing a continuous length of slide fastener chain or stringers by repeating the steps of clamping portions of a pair of continuous slide fastener tapes between a stationary mold and movable mold for injection molding, and then molding a plurality of slide fastener elements along the inner longitudinal edges of the tapes.

2. Cross-Reference to Other Application

In the molding of continuous slide fastener stringers through the use of an injection molds, the stringers are formed by repeating the steps of advancing intermittently a pair of long slide fastener tapes through the spacing between a stationary mold and movable mold, closing the molds on the tapes during the pauses in the advance of the tapes, injection-molding fastener elements along longitudinal edges of the tapes, opening the molds after the molding and subsequently advancing the tapes. Such a continuous molding operation can be arranged to proceed in two different ways. In one case, the arrangement is such that the spacing between the last fastener element of a previously molded fastener element row and the first fastener element of a subsequently molded fastener element row will be the same as the spacing between adjacent ones of the fastener elements in each of the fastener element rows. In the other case, a predetermined spacing is provided between the previously molded and subsequently molded fastener element rows. The present inventor has disclosed in a separately filed application (Japanese Utility Model Application No. 92716/78; U.S. Ser. No. 054421) positioning means applicable in either of these cases. More specifically, the specification of the application teaches feeding from the molds a predetermined length of that portion of the tapes, namely the stringers, equipped with the molded fastener elements, subsequently moving back or retracting the tapes until and further retraction thereof is halted due to abutment between a runner, formed at the time the fastener elements are molded on the stringer tapes, and a positioning stopper erected on one of the molds, and then carrying out the next molding cycle after tensioning the tapes. This method does not involve any appreciable technical problem for the case in which the stringers are continuously formed leaving a space between the last fastener element of a previously molded fastener element row and the first fastener element of the subsequently molded fastener element row. However, a problem is encountered in the instance where this spacing between previously and subsequently molded fastener element rows is to be made equal to the fastener element pitch in these rows. The problem is that the use of the ordinarily employed flat stopper does not provide enough thickness of mechanical strength because the spacing between adjacent ones of the fastener elements is quite small. In addition, as the feeding of the stringers or retraction of the tapes is performed by rollers after the stringers have been removed from the molds, there is the possibility that the stringers or tapes will experience displacement laterally of the rollers and that the tapes will be clamped by the molds at an improper position during the succeeding molding cycle.

SUMMARY OF THE INVENTION

It is therefore an object of the present invention to provide molds for the injection molding of continuous slide fastener chain or stringers, which mold is equipped with a durable stopper for determining the spacing between mutually adjacent individual fastener element rows each of which is to be molded along respective fixed lengths of fastener tapes, the molds also being capable of reliably setting and clamping the tapes at a predetermined position so that the tapes will not be shifted sideways away from the proper position at the time of injection molding, and the spacing is always equal to the pitch between adjacent fastener elements.

The present invention is therefore directed toward solving the foregoing problems encountered in the invention of the separately filed application.

Other objects, advantages and features of the present invention will be apparent from the following description of the preferred embodiment taken in conjunction with the accompanying drawings.

BRIEF DESCRIPTION OF THE DRAWINGS

FIG. 1 is a cross-sectional view of molds for the molding of continuous slide fastener chain in accordance with the present invention;

FIG. 2 is a front view taken along the line A—A of FIG. 1;

FIG. 3 is and enlarged front view of a portion of a molded runner; and

FIG. 4 is a front view illustrating abutment between an already molded runner and a positioning stopper.

DETAILED DESCRIPTION OF THE PREFERRED EMBODIMENT

As illustrated in FIG. 1, a stationary metal mold 1 and movable metal mold 2 are disposed in an upright posture and arranged to oppose each other, with a pair of tapes t being made to advance downwardly and in parallel through the clearance between the molds 1, 2. As in the prior art the molding surface of each mold 1, 2 is provided with cavities 3 for molding fastener elements e, and injected synthetic casting resin being forced into the cavities 3 through a sprue hole 4, runner cavity 5 and gate cavities 6 to form molded stringers which are subsequently dislodged from the movable mold 2 by means of ejector pins 7. Unlike the prior art, however, runner stoppers 8, 9 that seal off both ends of the runner cavities 5 are provided on the molds 1, 2 in the form of trapezoids so as to gradually narrow the width of the respective runner cavities 5 toward the interior thereof, as illustrated in FIG. 2. In addition, the lower end portion of the stationary mold 1 includes a projecting stopper 10 in the form of a trapezoid adjacent the stopper 9 with its width gradually narrowing toward the exterior of the mold 1, while the movable mold 2 includes a recess 11 into which the stopper 10 fits. It should be noted here that it suffices if only the upper runner stoppers 8 have the trapezoidal configuration. Moreover, the stopper 10 which serves as positioning means is provided with a spring 12. The positioning stopper 10 in cooperation with the spring 12 is adapted to be pushed inside the mold 1 if, for example, a situation should arise where, upon the completion of a molding cycle, there has not been sufficient feed of the stringers from which a runner 13 has not yet been removed, the runner 13 therefore pressing the stopper 10 when the molds are made to close. At such time this action of the positioning stopper 10 is detected by means such as a limit switch to interrupt the clamping of the molds and the injection of the casting resin. It is noteworthy that the positioning stopper 10 can be made large enough to fully mate with a trapezoidal recess 14 molded in the posterior end of the runner 13 by means of the runner stopper 8.

With the arrangement described above, an injection molding operation is carried out after the tapes t are clamped between the molds 1, 2, the molded stringers s are fed out from the molds until their posterior ends arrive at a point below the positioning stopper 10, and then, as the movable mold 2 is once again moved toward the stationary mold 1, the tapes t are upwardly retracted at the same time that they are being moved toward the stationary mold 1. Since the recess 14 as illustrated in FIG. 3 has been formed in the posterior end of the runner 13 by the runner stopper 8 at the time of the immediately preceding molding cycle for the fastener element row, the upward movement of the tapes t brings the recess 14 into abutting engagement with the positioning stopper 10 to thereby halt the retraction of the tapes. However, the portions of the tapes located between the molds 1, 2 are stretched and therefore maintained under a constant tension since the tapes are pulled by the weight of a plumb bob which is not shown. The next injection molding cycle is performed under these conditions.

As described above, incorporating and employing the molds of the present invention in an apparatus for the injection molding of continuous slide fastener stringers allows the trapezoidal runner stoppers of the molds to form a trapezoidal recess in the posterior end of a runner so that, when the runner abuts the positioning stopper also in the form of a trapezoid, the engagement of the recess with the stopper will halt the runner at a fixed position. Accordingly, the tapes when retracted to bring them to the predetermined position are regulated by the stopper and can thus be accurately set within the mold without experiencing any sideways displacement. Moreover, the fact that the positioning stopper having the trapezoidal portion penetrates into the interior of the trapezoidal recess formed in the posterior end of the runner, allows the stopper to be formed thicker than the conventional stopper by the amount of its penetration, i.e., the altitude of the trapezoid. It is therefore possible to increase the mechanical strength of the stopper and hence enhance its durability.

I claim:

1. In combination with molds for the injection molding of continuous slide fastener chain, of the type wherein the molds for the injection molding of continuous slide fastener chain include at least one stationary mold and two parallel rows of fastener element molding cavities, a runner cavity provided between said rows of fastener element molding cavities, and gate cavities for communicating each of said fastener element molding cavities to said runner cavity, the improvement wherein:

at least a runner stopper on the tape entrance side of each of the molds, said runner stopper being one of a pair of runner stoppers each located at the respective ends of said runner cavity in said molds, has a trapezoidal portion whose width gradually diminishes toward the interior of said runner cavity; and said stationary mold further includes adjacent to a runner stopper located on the tape exit side thereof a positioning stopper reducing its width toward the exterior of the mold and having a trapezoidal portion of a shape to engage with a trapezoidal recess formed in the posterior end of a runner by the recessed portion of said runner stopper on the tape entrance side.

2. Molds for injection molding according to claim 1, in which the positioning stopper of said stationay mold is outwardly urged by a spring provided within said stationary mold.

* * * * *